United States Patent
Takagi et al.

(10) Patent No.: US 8,149,286 B2
(45) Date of Patent: Apr. 3, 2012

(54) IMAGE SENSING APPARATUS AND CONTROL METHOD FOR SAME, AND INFORMATION PROCESSING APPARATUS, PRINTING APPARATUS, AND PRINT DATA GENERATION METHOD, USING CORRELATION INFORMATION RECORDED AS ATTRIBUTE INFORMATION OF IMAGE DATA OF FRAME

(75) Inventors: Atsushi Takagi, Yokohama (JP); Yasuyoshi Miyazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 685 days.

(21) Appl. No.: 12/065,656

(22) PCT Filed: Jun. 13, 2007

(86) PCT No.: PCT/JP2007/061869
§ 371 (c)(1), (2), (4) Date: Mar. 4, 2008

(87) PCT Pub. No.: WO2008/001608
PCT Pub. Date: Jan. 3, 2008

(65) Prior Publication Data
US 2009/0135257 A1 May 28, 2009

(30) Foreign Application Priority Data

Jun. 26, 2006 (JP) .................................. 2006-175786

(51) Int. Cl.
*H04N 5/235* (2006.01)
*H04N 5/228* (2006.01)

(52) U.S. Cl. .................................................. 348/222.1

(58) Field of Classification Search ............... 348/229.1, 348/297, 362, 367, 222.1
See application file for complete search history.

(56) References Cited

U.S. PATENT DOCUMENTS

| 5,974,219 | A | 10/1999 | Fujita et al. ..................... 386/52 |
| 6,321,024 | B1 | 11/2001 | Fujita et al. ..................... 386/55 |
| 6,952,234 | B2 * | 10/2005 | Hatano .......................... 348/363 |
| 7,301,563 | B1 * | 11/2007 | Kakinuma et al. ........ 348/208.13 |
| 7,755,663 | B2 * | 7/2010 | Kondo et al. ............... 348/208.1 |
| 7,755,664 | B2 * | 7/2010 | Kakinuma et al. .......... 348/208.1 |

(Continued)

FOREIGN PATENT DOCUMENTS

CN 1659874 8/2005

(Continued)

OTHER PUBLICATIONS

PCT International Preliminary Report on Patentability (PCT/ISA/373) in PCT/JP2007/061869 issued Feb. 3, 2009.

(Continued)

*Primary Examiner* — Nicholas Giles
(74) *Attorney, Agent, or Firm* — Fitzpatrick, Cella, Harper & Scinto

(57) ABSTRACT

In an image sensing apparatus capable of sensing a moving image, when sensing of the moving image, image data of the sensed moving image and image sensing condition data of such moving image are stored, a frame for printing is selected from among multiple frames of the image data forming the stored moving image, and a number of frames to synthesize is determined based on image sensing conditions for the selected frames. Of the plurality of frames of image data forming the moving image/image data of the selected frame and of the determined number of frames sensed before and after the selected frame is synthesized to generate image data for printing.

14 Claims, 14 Drawing Sheets

U.S. PATENT DOCUMENTS

| | | | |
|---|---|---|---|
| 7,764,310 B2* | 7/2010 | Nitta | 348/220.1 |
| 2004/0086193 A1 | 5/2004 | Kameyama et al. | 382/254 |
| 2005/0083548 A1 | 4/2005 | Suga et al. | 358/1.13 |
| 2006/0061672 A1* | 3/2006 | Nitta | 348/239 |
| 2006/0152587 A1* | 7/2006 | Kondo et al. | 348/207.99 |
| 2010/0091184 A1* | 4/2010 | Nitta | 348/448 |

FOREIGN PATENT DOCUMENTS

| | | |
|---|---|---|
| JP | 9-107517 | 4/1997 |
| JP | 2000-13733 | 1/2000 |
| JP | 2001-94911 | 4/2001 |
| JP | 2001-251573 | 9/2001 |
| JP | 2002-44575 | 2/2002 |
| JP | 2004-40393 | 2/2004 |
| JP | 2004-80599 | 3/2004 |
| JP | 2004-120628 | 4/2004 |

OTHER PUBLICATIONS

PCT Written Opinion of the International Searching Authority (PCT/ISA/237) in PCT/JP2007/061869 issued Feb. 12, 2009.

PCT Notification of Transmittal of Translation of International Preliminary Report on Patentability(PCT/ISA/338) in PCT/JP2007/061869 issued Feb. 12, 2009.

Chinese Office Action issued in Chinese Application No. 2007800013353 dated Aug. 7, 2009, and an English-language translation thereof.

* cited by examiner

FIG. 5

| IMAGE DATA FOR THE FRAMES | FRAME 1 | FRAME 2 | FRAME 3 | FRAME 4 | FRAME 5 | FRAME 6 | ... |
|---|---|---|---|---|---|---|---|
| ATTRIBUTE INFORMATION | CORRELATION FLAG =Y | CORRELATION FLAG =N | CORRELATION FLAG =Y | CORRELATION FLAG =Y | CORRELATION FLAG =Y | CORRELATION FLAG =N | ... |

FIG. 8

MANAGEMENT FILE

MOVING IMAGE FILE A
CORRELATION FLAG Y : FRAMES 1,2,3,4,5,~
PRINT SPECIFIED : FRAME 3,~
   ...

MOVING IMAGE FILE B
CORRELATION FLAG Y : FRAMES 2,7,8,9,15,16,17,18,~
PRINT SPECIFIED : FRAME 2,9,15
   ...

IMAGE SENSING APPARATUS AND CONTROL METHOD FOR SAME, AND INFORMATION PROCESSING APPARATUS, PRINTING APPARATUS, AND PRINT DATA GENERATION METHOD, USING CORRELATION INFORMATION RECORDED AS ATTRIBUTE INFORMATION OF IMAGE DATA OF FRAME

TECHNICAL FIELD

The present invention relates to an image sensing apparatus and a control method for the image sensing apparatus, and an information processing apparatus, a printing apparatus, and a print data generation method and, more specifically, to image sensing and printing of a moving image by the image sensing apparatus, an information processing apparatus, and a printing apparatus, and a control method for the image sensing apparatus, and a print data generation method.

BACKGROUND ART

In recent years, image sensing apparatuses such as digital cameras and digital video cameras that can sense an image with a simple operation and convert that sensed image into digital image data have come to be widely used. As a result, opportunities for viewing still images and moving images sensed with a digital camera or a digital video camera on PC display monitors and TV screens, as well as printing them using lab print services or home personal printers, have increased.

Further, with recent advances in technical performance of digital cameras, those that combine not only still image sensing but also moving image sensing capabilities as well are becoming common.

Under these circumstances, conventionally one went to a print shop and used the negative film or an index print to specify in handwriting the information for creating prints, such as the frames one wanted to print and the number of such frames, printing the date, and so forth. In recent years, it has become possible to set this sort of information in one's own digital camera and directly record to removable media such as a memory card. This capability enables printing to be done automatically according to specification, simply by attaching the removable media to a printer. Rather than printing each image one at a time while checking the digital image on the digital camera or the printer, this can save time and trouble, and reduce the burden on the user.

In order to achieve the above-described capability, a standard called DPOF (Digital Print Order Format) is known. DPOF is a format that, in order to achieve the merits to the user described above, takes automatic print information, such as the number of prints, the size, whether not to include the date, titles, trimming, etc., and stores it together with an image file on the removable media to be utilized when printing.

DPOF, which is currently widely known, assumes that that which is to be printed is a still image, and has the following types of prints:

Standard Print . . . 1 image file laid out per 1 print.
Index Print and Multiple Image Print . . . A plurality of image files laid out per 1 print.
Specific Size Print . . . 1 image file laid out per 1 print, but the image size is specified.

Then, the automatic print information is stored in a text file, and the file that stores that information is called a DPOF file.

In addition, recently, a direct printing system has been developed that enables digital image data to be transferred directly from the digital camera to a printer and printed without going through a PC. Moreover, printers have also been developed in which images sensed with a digital camera are saved to a medium such as a memory card, the medium is attached directly to the printer, and the images stored in the medium are printed.

Further, there is also a need for moving image printing, to print not only still images but also frames of moving images. A technique directed to printing moving images is proposed in Patent Document 1, for example. Moreover, a technique that is included in printing of moving images in DPOF is proposed for example in Patent Document 2.

In addition, in Patent Document 3, a technique is disclosed in which interframe difference values are continuously calculated and a timing of a change in scene of the moving image is extracted.

Patent Document 1: Japanese Patent Laid-Open No. 2004-040393
Patent Document 2: Japanese Patent Laid-Open No. 2001-251573
Patent Document 3: Japanese Patent Laid-Open No. 2004-080599

DISCLOSURE OF INVENTION

Problems that the Invention is to Solve

However, in the conventional inventions, for a single specified frame image of the moving image, the usual image correction, such as edge emphasis and brightness correction, is carried out, after which a still image for printing is generated. As a result, it has been difficult to remove image noise unique to the moving image. Moreover, in order to extract a change of scene from the moving image as in Patent Document 3, the correlations between frames must be checked one at a time, and such processing takes times.

In addition, with the still image, image sensing condition data is stored in a header and moreover the still image itself records basically a frozen moment in time, so that when the still image is printed image correction is carried out and the still image printed using only data for a single print.

By contrast, with moving image printing, a single print is extracted from chronologically continuous images and printed. In this case, techniques are known that use the chronologically continuous preceding and succeeding images of the image to be printed and divide the image into a moving area and a still area and carry out two types of image processing, or that carry out pixel interpolation when enlarging and printing a frame image from a field image.

Carrying out this type of synthesis or correction is effective in providing enhanced image resolution and sensitivity, and if the subject is staying still, the effect is increased as the number of images used in synthesis and correction increases. However, in moving image sensing, there is a very strong possibility that the angle of view or the exposure will change. As a result, when attempting to print out a single scene, with the conventional techniques, used as is, it is difficult to optimally correct the image and improve its quality.

The present invention has been made in consideration of the above-described problems of the background art, and has as its object to enable generation of moving image data for high-quality printing more reliably and promptly.

Means of Solving the Problems

To achieve the above-described object, the present invention provides an image sensing apparatus capable of sensing a moving image that comprises a storage unit that stores image data of a sensed moving image during image sensing of a moving image and stores image sensing condition data for said moving image; a selection unit that selects a frame for printing from a plurality of frames of the image data that form the moving image stored in said storage unit; a synthesizing unit that synthesizes a plurality of frames of the image data that form the moving image and generates image data for printing; and a determination unit that determines a number of frames to synthesize based on the image sensing conditions for the frame selected by said selection unit, said synthesizing unit synthesizing the image data of said selected frame and the image data of the number of frames determined by said determination unit sensed before and after said selected frame.

In another configuration, the image processing apparatus of the present invention comprises an input unit that inputs a plurality of frames of image data that form a moving image and image sensing condition data for said moving image printing from said input plurality of frames; a synthesizing unit that synthesizes a plurality of frames of the image data that form the moving image and generates image data for printing; and a determination unit that determines a number of frames to synthesize based on the image sensing conditions for the frame selected by said selection unit, said synthesizing unit synthesizing the image data of said selected frame and the image data of the number of frames determined by said determination unit sensed before and after said selected frame.

In another configuration, a printing apparatus of the present invention comprises an input unit that inputs a plurality of frames of image data that form a moving image and image sensing condition data for said moving image; a selection unit that selects a frame for printing from said input plurality of frames; a synthesizing unit that synthesizes a plurality of frames of the image data that form the moving image and generates image data for printing; a determination unit that determines a number of frames to synthesize based on the image sensing conditions for the frame selected by said selection unit; and a printing unit that prints image data for printing synthesized by said synthesizing unit, said synthesizing unit synthesizing the image data of said selected frame and the image data of the number of frames determined by said determination unit sensed before and after said selected frame.

A print data generation method of the present invention comprises an acquisition step of acquiring a plurality of frames of image data that form a moving image and image sensing condition data for said moving image; a selection step of selecting a frame for printing from said acquired plurality of frames of image data; a synthesizing step of synthesizing a plurality of frames of image data that form a moving image and generating image data for printing; and a determination step of determining a number of frames to synthesize in said synthesizing step based on the image sensing conditions for the frame selected in said selection step, said synthesizing step synthesizing the image data of said selected frame and the image data of the number of frames determined in said determination step sensed before and after said frame.

In another configuration, an image sensing apparatus capable of sensing a moving image comprises an image sensing unit that senses a moving image; and a recording unit that records on a recording medium a correlation between image data of a frame newly acquired by said image sensing unit and image data of a frame sensed immediately before said newly acquired frame together with said newly acquired frame image data.

In another and further configuration, the image processing apparatus of the present invention comprises an input unit that inputs a plurality of frames of image data that form a moving image and a correlation among said plurality of frames of image data; a selection unit that selects a frame for printing from said input plurality of frames of image data; an extraction unit that extracts another frame having a correlation with said selected frame based on said correlation; a synthesizing unit that synthesizes image data of said selected frame and image data of a frame extracted by said extraction unit and generates image data for printing; and an output unit that outputs to a printing apparatus image data for printing synthesized by said synthesizing unit.

In another and further configuration, the printing apparatus of the present invention comprises an input unit that inputs a plurality of frames of image data that form a moving image and a correlation among said plurality of frames of image data; a selection unit that selects a frame for printing from said input plurality of frames of image data; an extraction unit that extracts another frame having a correlation with said selected frame based on said correlation; a synthesizing unit that synthesizes image data of said selected frame and image data of a frame extracted by said extraction unit and generates image data for printing; and a printing unit that prints image data for printing synthesized by said synthesizing unit.

A control method for an image sensing apparatus capable of sensing a moving image comprises an image sensing step of sensing a moving image with an image sensing unit; and a recording step of recording on a recording medium a correlation between image data of a frame newly acquired in said image sensing step and image data of a frame sensed immediately before said newly acquired frame together with said newly acquired frame image data.

In another and further configuration, the print data generation method of the present invention comprises an acquisition step of acquiring a plurality of frames of image data that form a moving image and information relating to a correlation among said plurality of frames of image data; a selection step of selecting a frame for printing from said acquired plurality of frames of image data; an extraction step of extracting another frame having a correlation with said selected frame based on said correlation; a synthesizing step of synthesizing image data of said selected frame and image data of a frame extracted in said extraction step and generating image data for printing; and an output step of outputting image data for printing synthesized in said synthesizing step to a printing unit.

Other features and advantages of the present invention will be apparent from the following description when taken in conjunction with the accompanying drawings, in which like reference characters designate similar or identical parts throughout the several views thereof.

BRIEF DESCRIPTION OF DRAWINGS

The accompanying drawings are included in and form a part of the present specification, show embodiments of the present invention, and are used for the purpose of describing the basic principles of the present invention together with the description thereof, in which:

FIG. 5 is a diagram showing an example of a directory structure of an image file recorded on a recording medium in the first embodiment of the present invention;

FIG. 8 is a diagram showing an example of a structure of a management file recorded on a storage medium of the first embodiment of the present invention;

BEST MODE FOR CARRYING OUT THE INVENTION

Preferred embodiments of the present invention will now be described in detail in accordance with the accompanying drawings.

First Embodiment

Figure 1:
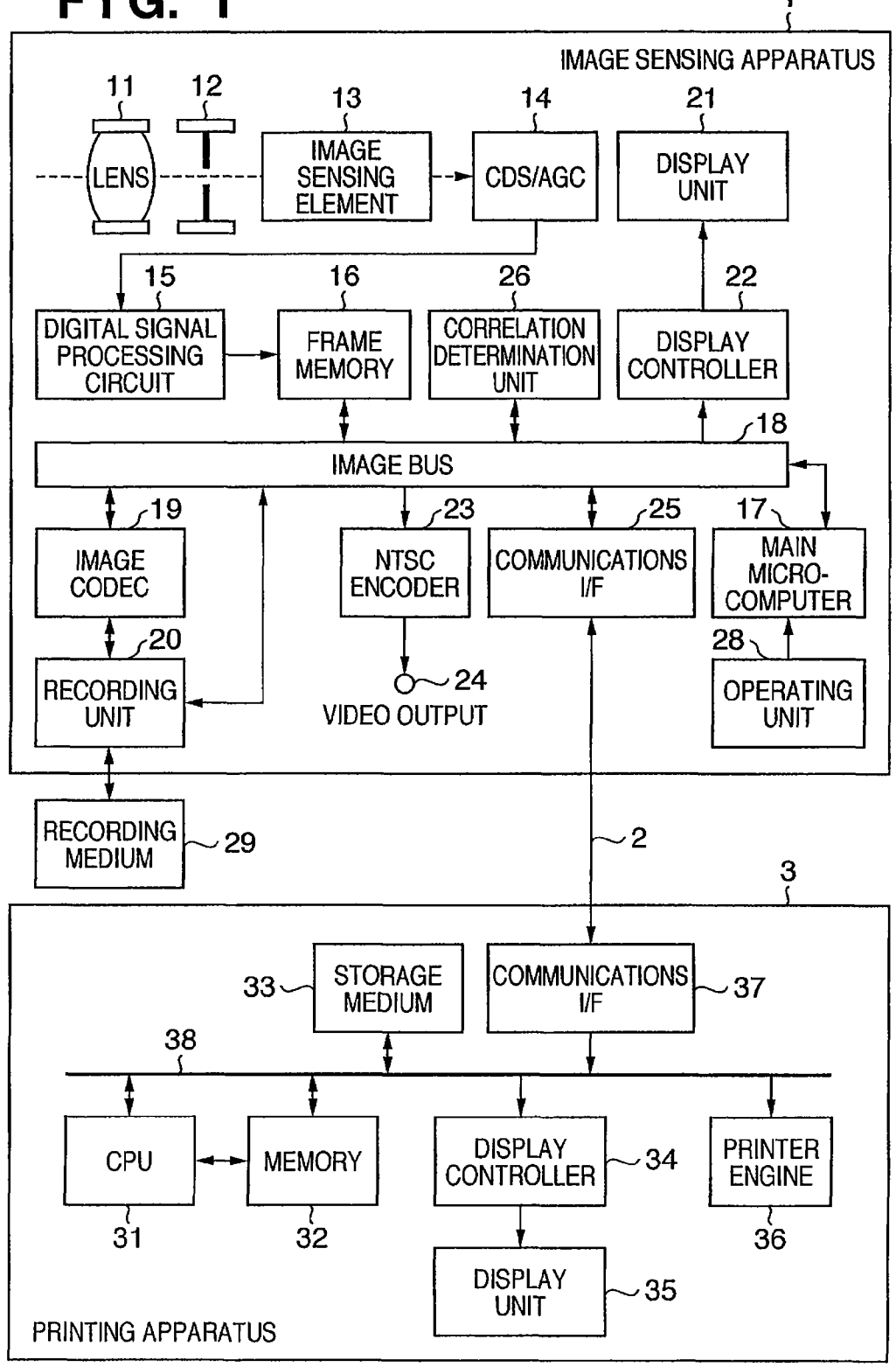
FIG. 1 is a block diagram showing a configuration of a system of a first embodiment of the present invention.

FIG. 1 is a block diagram showing a configuration of a system of a first embodiment of the present invention, comprised mainly of an image sensing apparatus 1 and a printing apparatus 3.

The image sensing apparatus 1 is an image sensing apparatus capable of sensing a moving image, such as a digital still camera, a digital video camera, or the like. In the image sensing apparatus 1 of the first embodiment of the present invention, reference numeral 11 designates a lens comprised of a focus lens, a zoom lens, or the like, 12 designates a shutter equipped with an aperture function (in the case of a digital video camera 100, an aperture), and 13 designates an image sensing element typified by a CCD sensor, CMOS sensor, or the like.

Reference numeral 14 designates a correlated double sampling/auto gain control circuit (CDS/AGC), 15 designates a digital signal processing circuit, and 16 designates a frame memory having a capacity capable of storing at least two frames of data. It should be noted that although the first embodiment is described as reading out a single frame of image signals in a single output operation from the image sensing element 13 as described later, it goes without saying that a single field of image signals may be output by interlace scanning. In addition, regardless of whether it is a frame or a field, the moving image output from the image sensing element 13 in a single output operation is called a "frame" in the embodiment.

Reference numeral 17 designates a main microcomputer, which controls overall operation of the image sensing apparatus 1. Reference numeral 18 designates an image bus, 19 designates an image codec, and 20 designates a recording unit that records image data compressed by the image codec 19 to a removable external recording medium 29 such as a memory card, digital video tape, DVD or the like, as well as reads out image data from the external recording medium 29.

Reference numeral 21 designates a display unit such as a liquid crystal display (LCD) or the like and 22 designates a display controller that controls display of the display unit 21. Reference numeral 23 designates a NTSC encoder, 24 designates a video output terminal, and 25 designates an IEEE 1394 standard, USB standard or other such standard communications interface (I/F). Reference numeral 26 designates a correlation determination unit that determines a correlation between image data, and 28 designates an operating unit comprised of buttons, switches, dials, touch panels, and the like.

The printing apparatus 3 includes a CPU 31, a memory 32, an internal bus 38, a storage medium 33 such as a memory card, a HDD or the like, a display unit 35 that displays operation panels and preview screens, and a display controller 34 that controls display of the display unit 35. Further, the printing apparatus 3 includes an IEEE 1394 standard, USB standard or other such standard communication interface (I/F) 37, a printer engine 36, and the like.

The image sensing apparatus 1 and the printing apparatus 3 are connected by a communications cable 2, and transfer print data as well as exchange various control data. It should be noted that although in the example shown in FIG. 1 the apparatuses are connected by a cable, the present invention is not limited by communication standard or connection form. For example, in a case in which the communication interface is a wireless communication means based on communication standards such as infrared communication, Bluetooth standard, or the like, communications may be conducted wirelessly. In addition, the recording medium 29 of the image sensing apparatus 1 may be installed as the storage medium 33 of the printing apparatus 3, and print data and various types of control data exchanged via the recording medium 29.

Figure 2:
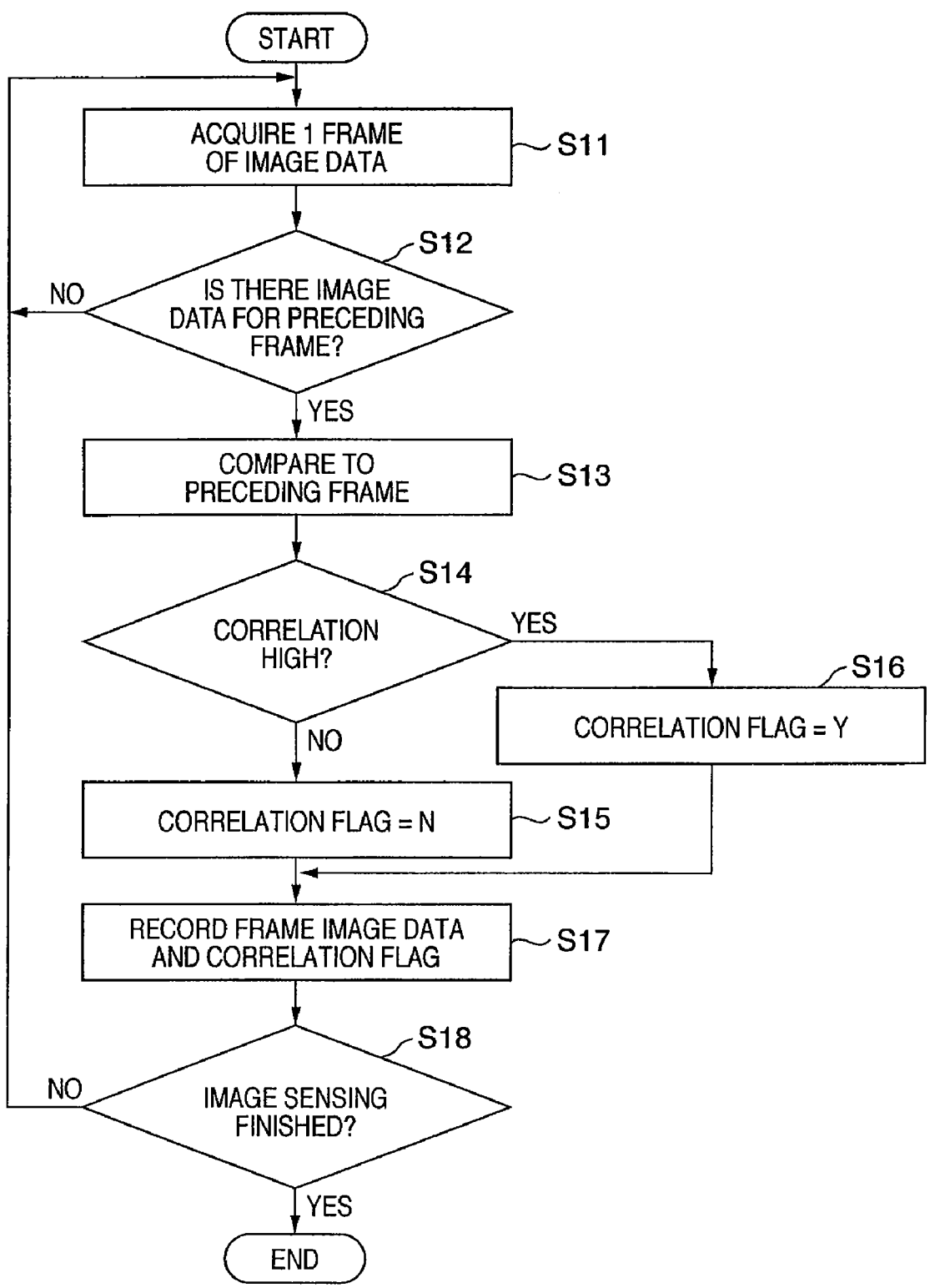
FIG. 2 is a flow chart illustrating a moving image sensing process of an image sensing apparatus of the first embodiment of the present invention.

A description is now given of a moving image sensing operation with the image sensing apparatus 1 having the configuration shown in FIG. 1, while referring to the flow chart shown in FIG. 2.

Light from a subject enters through the lens 11 and the shutter 12, strikes the image sensing element 13, and is converted into electrical signals. At this point, if moving image recording is instructed from the operating unit 28, the image sensing element 13, after storing electrical signals over a predetermined time period after clearing stored electrical signals, outputs a single frame of stored electric charge (image signal) to the CDS/AGC 14. The CDS/AGC 14 sample-holds the image signal thus obtained and adjusts it to an appropriate signal level. The image signal that has been level-adjusted by the CDS/AGC 14 undergoes digital signal processing at the digital signal processing circuit 15 and the generated image data is stored in a predetermined area of the frame memory 16 (step S11).

Subsequently, in step S12, it is determined whether or not image data for the preceding frame exists in the frame memory 16. If there is no image data for the preceding frame in the frame memory 16, then since the image data acquired in step S11 is the first image data in the present moving image sensing operation, processing returns to step S11. If there is image data for the preceding frame in the frame memory 16 (YES at step S12), then processing proceeds to step S13 and the correlation determination unit 26 reads out the image data acquired this time and the image data for the preceding frame from the frame memory 16 and determines the correlation. It should be noted that the correlation determination unit 26 determines the correlation using a known method.

If the results of the determination performed by correlation determination unit 26 indicate that the correlation is higher than a predetermined level (YES at step S14), a correlation flag is set to Y (step S16), and if lower (NO at step S14), the correlation flag is set to N (step S15).

Subsequently, in step S17, the image codec 19 reads out the image data acquired this time from the frame memory 16, compression encodes the image data with a method suitable for moving images, and transfers the compression encoded image data to the recording unit 20. At the recording unit 20, the compression encoded image data is converted to a format suitable for recording and recorded onto the recording medium 29 together with the correlation flag obtained from the correlation determination unit 26.

Once recording of one frame of image data by the processing described above is finished, in step S18 it is determined whether or not moving image sensing end is instructed by the operating unit 28, and if instructed, image sensing processing is ended. If image sensing end is not instructed, processing returns to step S11 and the image signal for the next frame is read out. It should be noted that in the next routine newly output image data is stored in the region of the frame memory 16 where the image data for the preceding frame was stored in the previous routine.

Thus, as described above, during moving image sensing in the first embodiment of the present invention, image data for each frame and the correlation flag to the image data for the preceding frame are recorded on the recording medium 29.

Figure 4:
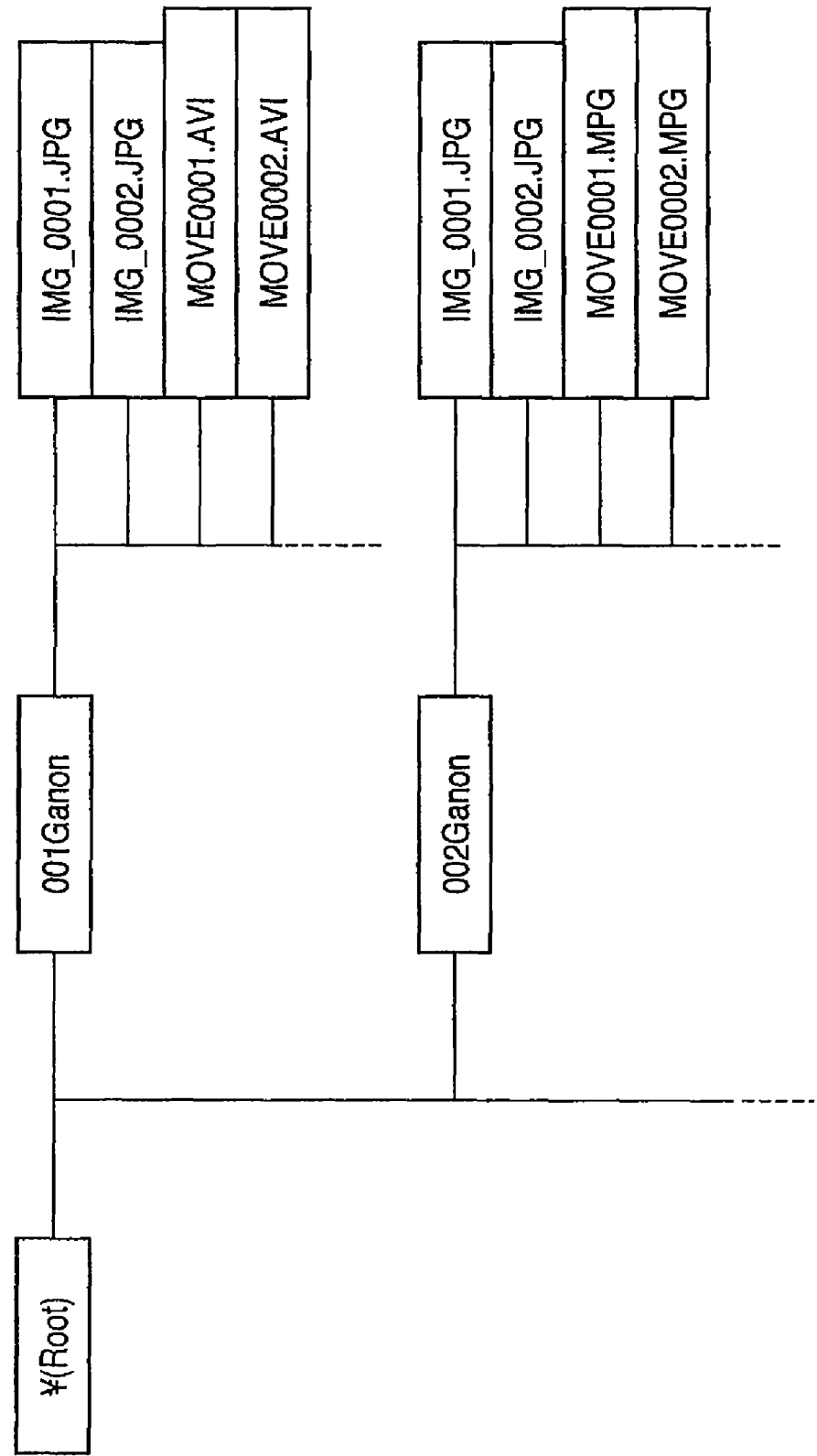
FIG. 4 is a diagram showing an example of a directory structure of an image file recorded on a recording medium in the first embodiment of the present invention.

FIG. 4 is a diagram showing an example of a directory structure of an image file recorded on the recording medium 29. FIG. 4 shows a state in which, in a case in which the image sensing apparatus 1 is capable of imaging a still image, sensed still images and moving images are stored mixed together on the same recording medium 29.

FIG. 5 is a schematic diagram showing the general structure of a moving image file recorded on the recording medium 29. As described above with reference to FIG. 2, when investigating the correlation between individual moving image frames in advance and recording image data for the frames in a moving image file, the image sensing apparatus 1 adds the correlation flag to each frame as attribute information.

A description is now given of a process of generating a still image for printing carried out by the image sensing apparatus 1 that is carried out when printing a moving image recorded as described above, with reference to FIG. 3.

First, specification by user of the frame of the moving image to be printed is awaited (step S21). In a case in which an image file like that shown in FIG. 4 is saved on the recording medium 29, the user selects the image file of the moving image he/she wishes to print, and further, selects the frame to print while playing back the selected image file.

Figure 6:
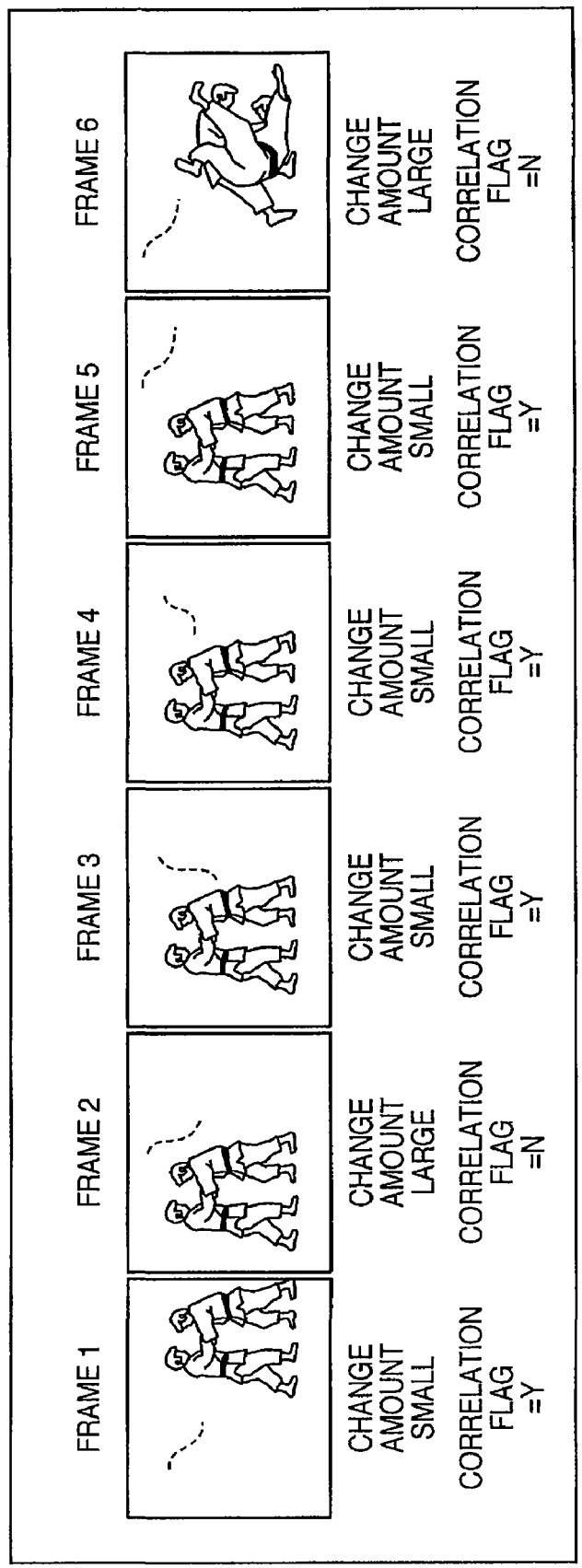
FIG. 6 is a schematic diagram illustrating moving image frame images and correlation flags of the first embodiment of the present invention.

For example, in a case in which frame images of a moving image and correlation flags are recorded as shown in FIG. 6, first, scene change points are extracted and the moving image is stopped at that frame. Here, because the amount of change between frame 2 and frame 1 is large, the moving image is stopped at frame 2. Thereafter, the user checks the frames of the image with the display unit 21 while sending one frame at a time to the display screen starting from frame 2, and specifies printing at the desired frame using the operating unit 28. Here, for example, frame 3 is specified for printing.

Once printing is specified, starting from the specified moving image frame the correlation flags of the preceding moving image frames are checked to find a first frame number (correlation start frame) of continuous correlation frames (step S22). Here, first, it is confirmed whether or not the correlation flag of the specified frame is Y. If the correlation flag is N, then the specified frame is determined to be the correlation start frame. By contrast, if the flag is Y, then the correlation flag of a frame preceding the specified frame is checked. If the correlation flag of the preceding frame is N, then the preceding frame is determined to be the correlation start frame. By contrast, if the correlation flag of the preceding frame is Y, then the correlation flag of a frame two frames preceding the specified frame is checked. This correlation flag confirmation operation is repeated until a frame for which the correlation flag is N is reached, and the frame for which the correlation flag is N is determined to be the correlation start frame. Then, the correlation start frame is stored (step S23). In the example shown in FIG. 6, frame 2 is stored as the correlation start frame.

Subsequently, from the specified moving image, the correlation flags of the following moving image frames are checked in succession to find a last frame number (correlation end frame) of continuous correlation frames (step S24). Here, first, it is confirmed whether or not the correlation flag of the frame following the specified frame is Y. If the correlation flag is N, then the specified frame is determined to be the correlation end frame. By contrast, if the flag is Y, then the correlation flag of a frame two frames following the specified frame is checked. If the correlation flag of the frame two frames following the specified frame is N, then the frame following the specified frame is determined to be the correlation end frame. By contrast, if the correlation flag of the frame two frames following the specified frame is Y, then the correlation flag of a frame three frames following the specified frame is checked. This correlation flag confirmation operation is repeated until a frame for which the correlation flag is N is reached, at which point the frame before the frame for which the correlation flag is N is determined to be the correlation end frame. Then, the correlation end frame is stored (step S25). In the example shown in FIG. 6, frame 5 is stored as the correlation end frame.

By the above-described process, a range of frames of high correlation with the moving image frame specified for printing in step S21 can be obtained. In the example shown in FIG. 6, for the frame 3 specified for printing, frames 2-5 are obtained as the frames of high correlation.

Subsequently, in step S26, image data for all the frames within the above-described detected range (in the example in FIG. 6, frames 2-5) is synthesized, enabling a still image for printing of the desired moving image frame to be generated.

Figure 7:
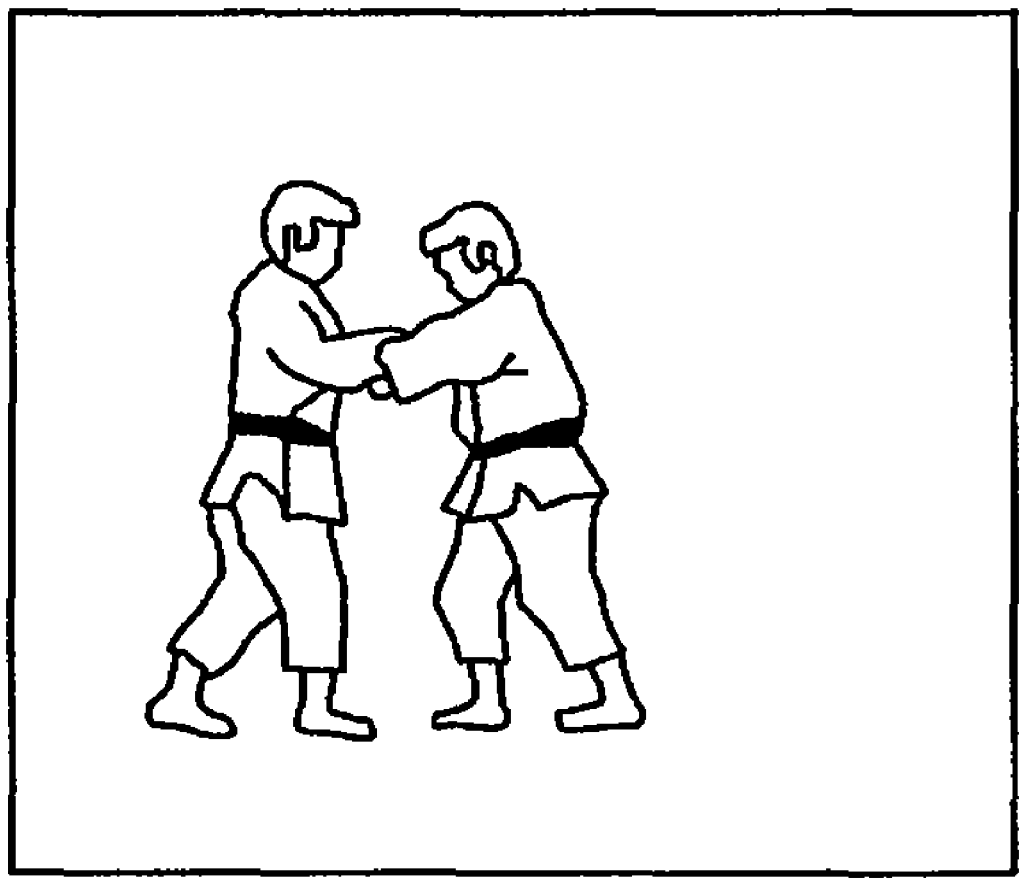
FIG. 7 is a diagram showing an example of a still image for printing of the first embodiment of the present invention.

FIG. 7 is a diagram showing an example of a still image for printing produced by synthesizing the plurality of moving image frames of high correlation shown in FIG. 6 (frames 2-5). The moving image signal is a signal in which similar image information is repeated in frame cycles, and the correlation between frames is extremely strong. By contrast, there is no correlation for the noise component included in the image signal. As a result, as a synthesized image, for example, when time-averaging the image signal in units of frames, only the noise component decreases while the signal component substantially remains, thus enabling noise to be reduced.

The image sensing apparatus 1 sends the still image for printing generated in this way to the printing apparatus 3 through the communications interface 25. At the printing apparatus 3, the still image for printing received through the communications interface I/F 37 is printed.

Thus, as described above, according to the first embodiment of the present invention, because information indicating the correlation is recorded together with the image data for the frames during recording of the moving image, correlated frames can be extracted quickly when printing. Moreover, the image data for the extracted frames is synthesized to generate a still image for printing to provide high-quality, speedy printing of moving image scenes.

Variation of the First Embodiment

Although in the above-described first embodiment a description is given of generating still image data for printing at the image sensing apparatus 1, alternatively, such still image data for printing may be generated at the printing apparatus 3. In such case, the processing described with reference to FIG. 3 may be carried out by the printing apparatus 3.

Figure 3:
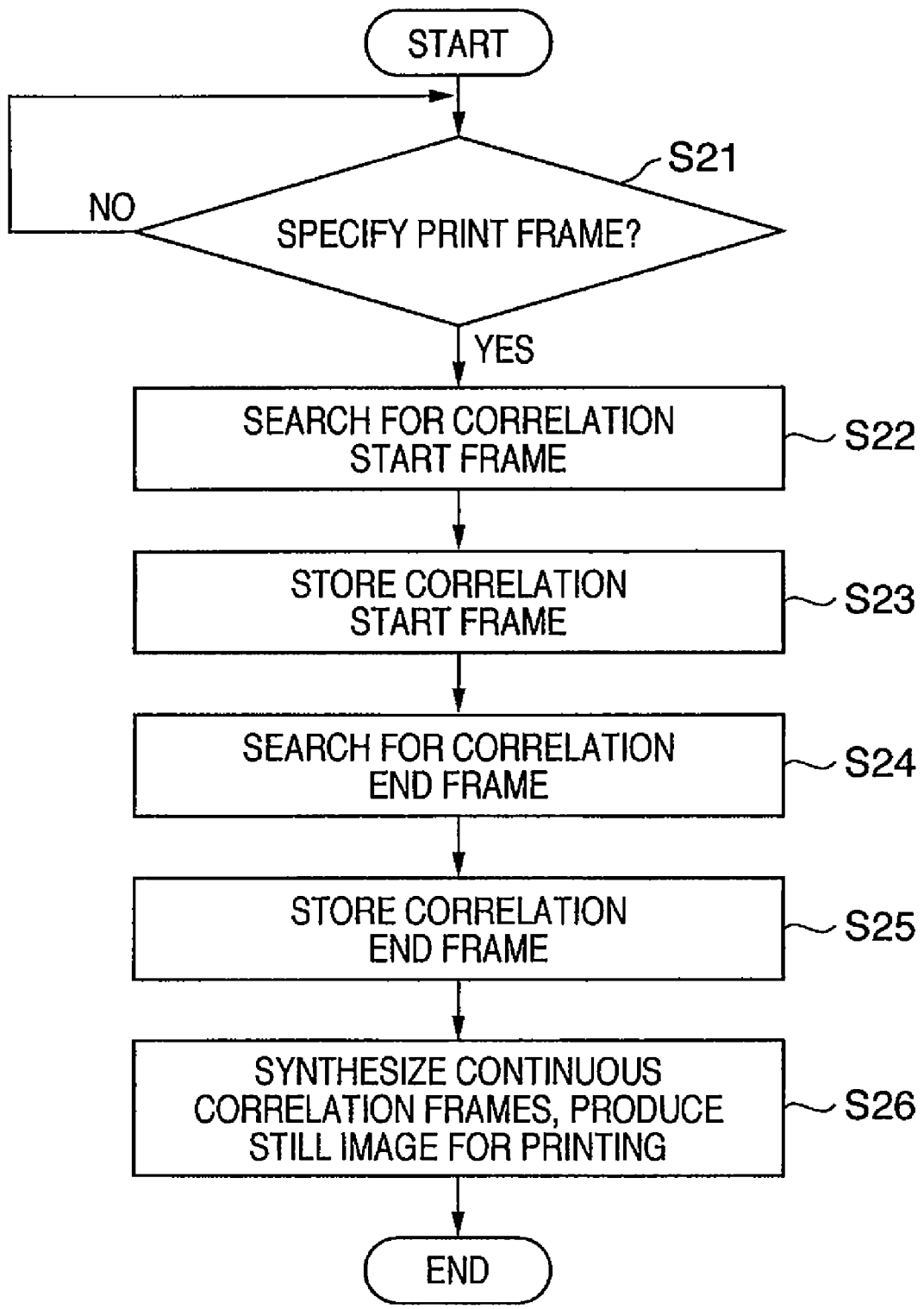
FIG. 3 is a flow chart illustrating a process of generating a still image for printing of a moving image of the first embodiment of the present invention.

In addition, the processing described referring to FIG. 3 can be divided between the image sensing apparatus 1 and printing apparatus 3. For example, at the image sensing apparatus 1 the frame specified for printing by the user may be kept on the recording medium 29 as a management file, and the printing apparatus 3 generate a still image for printing based on that management file.

FIG. 8 is a diagram showing an example of a structure of a management file recorded on the recording medium 29. It is possible to record a plurality of frames specified for printing for a single file, "moving image file A". Doing so enables a plurality of frames for printing to be specified for printing when executing a single printing. Moreover, as shown in FIG. 8, correlation flag information may be added to the management file. In such case, since the correlation flag does not need to be embedded in the moving image file, it has the advantage of being easy to install.

In addition, the processing described referring to FIG. 3 may also be executed by an image processing apparatus other than the image sensing apparatus 1 and the printing apparatus 3. An example of such a system configuration is shown in FIG. 9.

Figure 9:
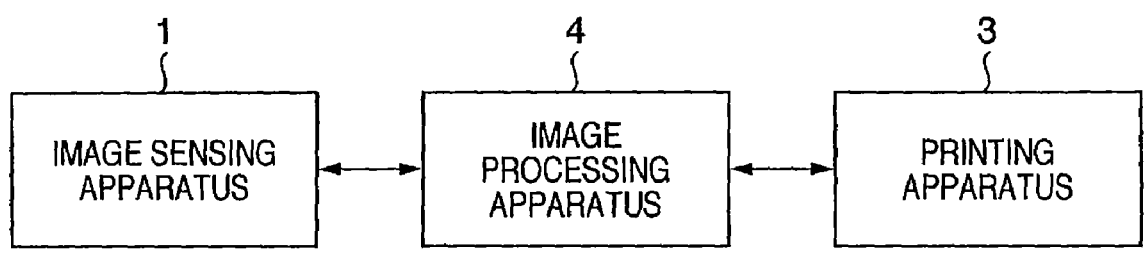
FIG. 9 is a diagram showing a configuration of a system of a variation of the first embodiment of the present invention.

In FIG. 9, interposition of an image processing apparatus between the image sensing apparatus 1 and the printing apparatus 3 is different from the configuration of the system shown in FIG. 1. In this configuration, the moving image file recorded by the image sensing apparatus 1 is input to the image processing apparatus 4 through the recording medium 29 or the communications I/F, the processing shown in FIG. 3 is carried out by the image processing apparatus 4, and still image data for printing is generated. Then, the generated still image data for printing is sent to the printing apparatus 3.

In addition, in the first embodiment described above, the still image for printing is produced after specification for printing. By contrast, in the image sensing apparatus 1, the still image for printing may be produced simultaneously with moving image sensing using the algorithm described in steps S22-S26 shown in FIG. 3 and recorded in the moving image data or the storage medium 29. In such case, when a given moving image frame is specified for printing in the printing apparatus 3, the still image for printing generated using that moving image frame is simply retrieved and printed, enabling a time from print specification to printing to be shortened and productivity to be enhanced.

Second Embodiment

A description is now given of a second embodiment of the present invention.

Figure 10A:
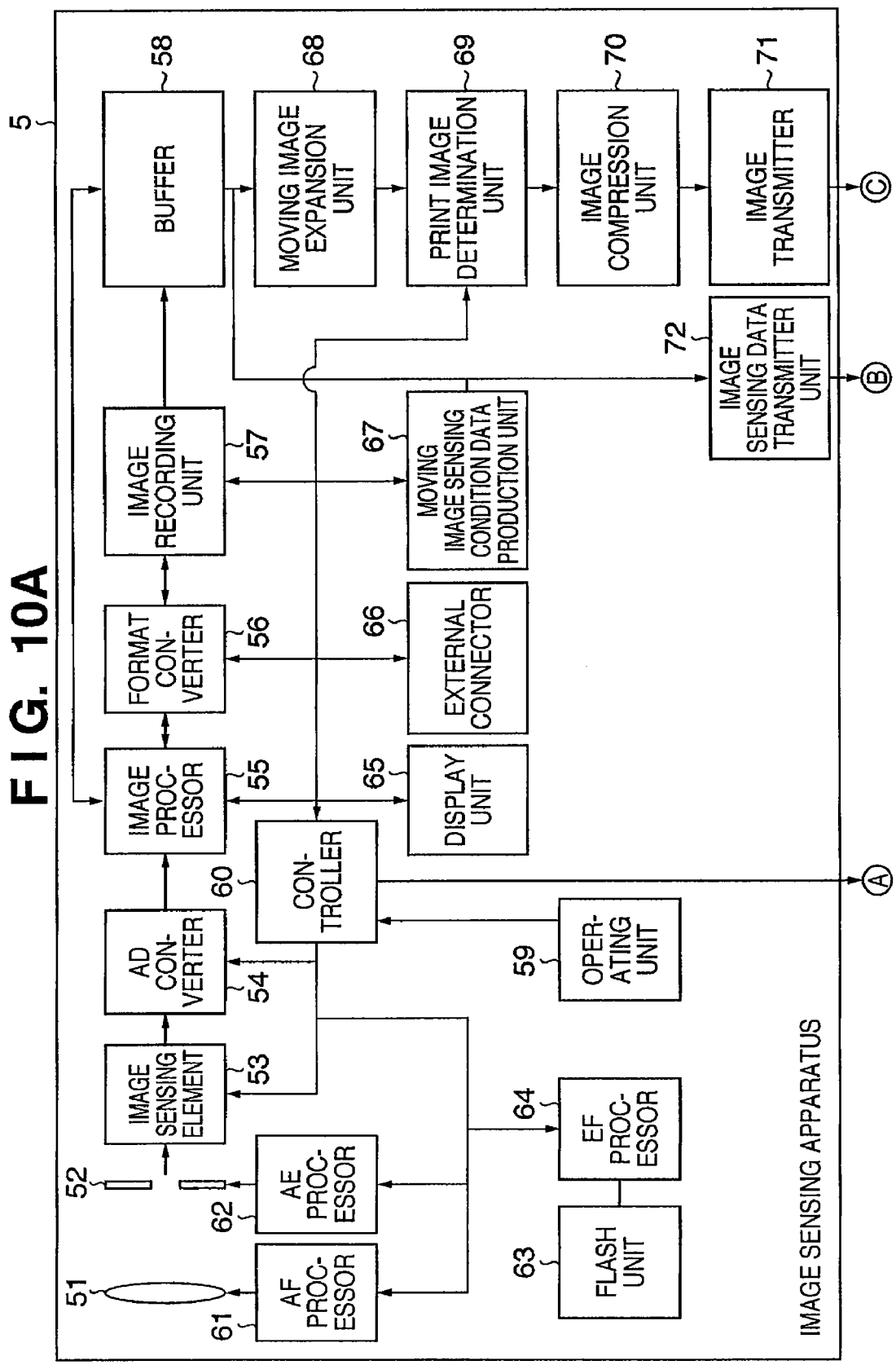
FIG. 10A is a block diagram showing a configuration of a system of a second embodiment of the present invention.
Figure 10B:
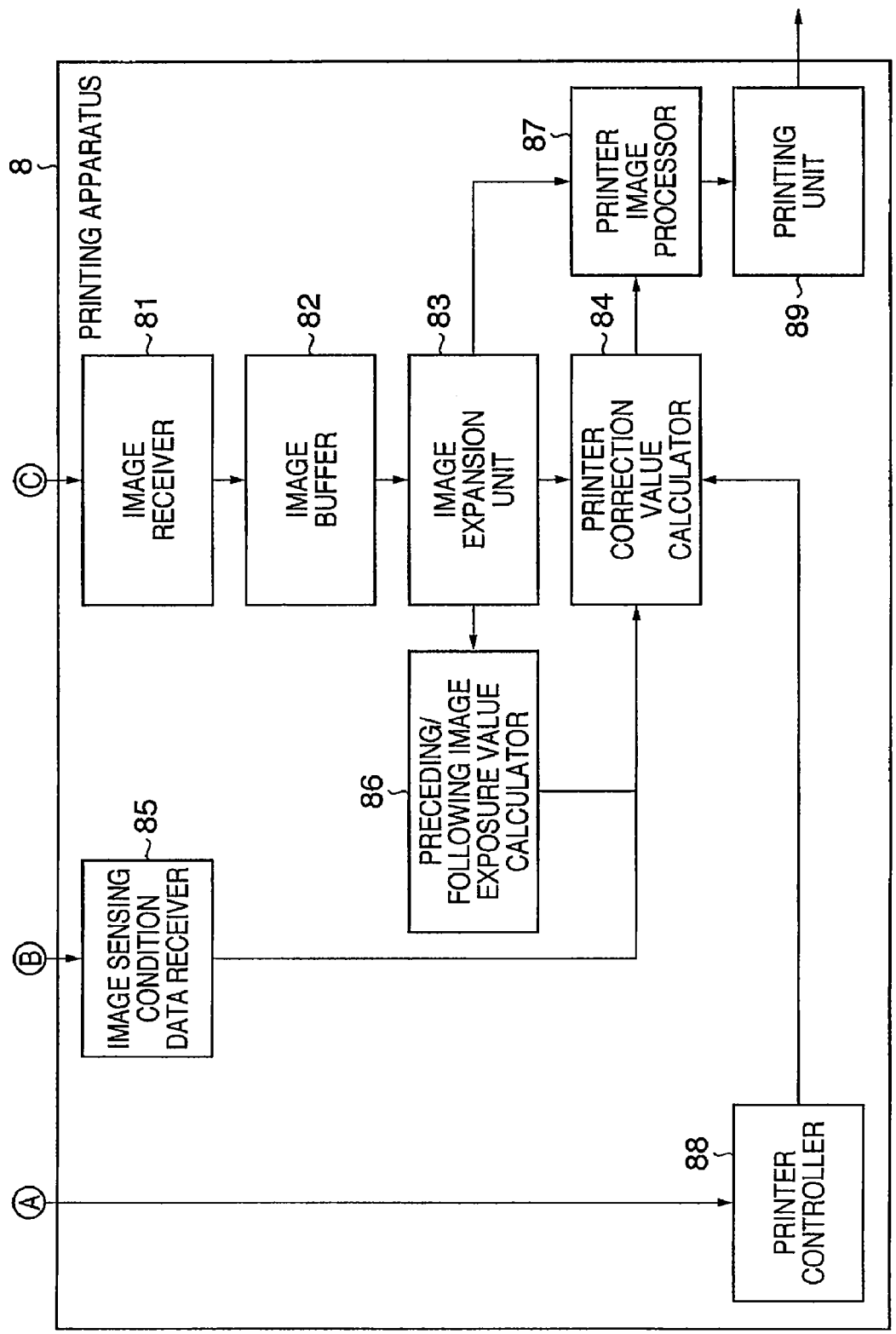
FIG. 10B is a block diagram showing a configuration of a system of the second embodiment of the present invention.

FIG. 10A and FIG. 10B are block diagrams showing the general configuration of the system of the second embodiment of the present invention, mainly composed of an image sensing apparatus 5 (FIG. 10A) and a printing apparatus 8 (FIG. 10B).

In the image sensing apparatus 5, reference numeral 51 designates a lens comprised of a focus lens, a zoom lens, and the like, and 52 designates a shutter equipped with an aperture function (in the case of a digital video camera, an aperture). Reference numeral 53 designates an image sensing element typified by a CCD sensor, CMOS sensor, or the like. Reference numeral 60 designates a controller that controls overall operation of the image sensing apparatus 5. Reference numeral 61 designates an AF processor that receives instructions from the controller 60 and drives the focus lens of the lens 51 and carries out AF processing, and reference numeral 62 designates an AE processor that receives instructions from the controller 60 and controls the aperture and the shutter speed and carries out AE processing.

Reference numeral 54 is an A/D converter that converts analog image signals output from the image sensing element 53 into digital image signals, and 55 is an image processor that carries out certain pixel interpolation processing and color conversion processing on the digital image signals converted by the A/D converter 54. Reference numeral 56 designates a format converter that converts the image data processed by the image processor 55 into a format suitable for recording, such as MPEG or JPEG or the like. Reference numeral 58 designates a memory having a buffer function for temporarily storing image data, and 57 designates an image recording unit that records the image data, format-converted by the format converter 56, in the buffer 58.

Reference numeral 63 designates a flash unit, 64 designates an EF (Electric Flash) processor, and 59 designates an operating unit comprised of buttons and switches, touch panels, dials, and the like. Reference numeral 65 designates a display unit such as an LCD, and 66 designates an external connector for connecting the image sensing apparatus 5 to another device.

Reference numeral 67 designates a moving image sensing condition data production unit, which generates image sensing condition data during moving image sensing. The image sensing condition data is described later. Reference numeral 72 designates an image sensing condition data transmitter unit that transmits image sensing condition data to the printing apparatus 8.

Reference numeral 68 designates a moving image expansion unit that expands image data of a predetermined format stored temporarily in the buffer 58, and 69 designates a print image determination unit that determines an image to be printed. Reference numeral 70 designates an image compression unit that once again compresses the image data (still image) to be printed that is determined by the print image determination unit 69, and 71 designates an image transmitter that transmits the image data compressed by the image compression unit 70 to the printing apparatus 8.

In the printing apparatus 8, reference numerals 81 and 85 respectively designate an image receiver and an image sensing condition data receiver that respectively receive image data and image sensing condition data sent from the image sensing apparatus 5. Reference numeral 82 designates an image buffer that temporarily stores image data received via the image receiver 81, and 83 designates an image expansion unit that expands the image data stored in the image buffer 82. Reference numeral 86 designates a preceding/following image exposure value calculator that calculates exposure values for multiple image data that has been expanded. Reference numeral 84 designates a printer correction value calculator that determines a correction value to be used in printing using the image sensing condition data received via the image sensing condition data receiver 85, and 87 designates a printer image processor that carries out correction processing on the image data using the determined correction value. Reference numeral 88 designates a printer controller that controls the printer in response to control by the controller 60 of the image sensing apparatus 5, and 89 designates a printing unit that prints the image processed by the printer image processor 87.

A description is now given of processing during moving image sensing in the image sensing apparatus 5, with reference to FIG. 10A and FIG. 10B.

When a user first instructs moving image sensing using the operating unit 59, the controller 60 issues AF and AE processing instructions to the AF processor 61 and the AE processor 62, respectively, moves the lens 51 and the shutter 52 equipped with the aperture function, and carries out appropriate AF and AE processing. Light entering through the lens 51 and the shutter 52 strikes the image sensing element 53 and is converted into an analog image signal, is further converted into a digital image signal by the A/D converter 54, and is sent to the image processor 55. The foregoing process is repeated at predetermined cycles until a moving image sensing end instruction is input from the operating unit 59. After the moving image sensing end instruction the format of the data sent from the image processor 55 is determined and produced by the format converter 56, and the image recording unit 57 saves an image file in the buffer 58.

Moreover, together with the moving image data, the image sensing condition data during moving image sensing is also saved. Further, the second embodiment is described as producing a thumbnail file (saved separately from the image file). The image sensing condition data produced by the moving image sensing condition data production unit 67 is attached to the thumbnail file and stored.

As the image sensing condition data described in the thumbnail file there is, for example, exposure conditions, such as aperture, shutter speed, ISO sensitivity, By value, exposure correction value, flash amount, image sensing scene information, photometric weighting information and so forth; camera shake information from angular velocity sensors; and lens information. In addition, in order to carry out moving image sensing the second embodiment also makes image sensing condition data of an amount of change in parameters over time during moving image sensing. For example, although a change in the angle of view can occur during moving image sensing, in such cases there is also a change in exposure, and such change data is also included in the image sensing condition data. However, because there is a risk that the data volume could grow very large if exposure information for all frame images were to be stored, for example, the aperture Av, shutter speed Tv, and the gain Gain at the starting time and the ending time of a change in exposure are stored.

Figure 11:
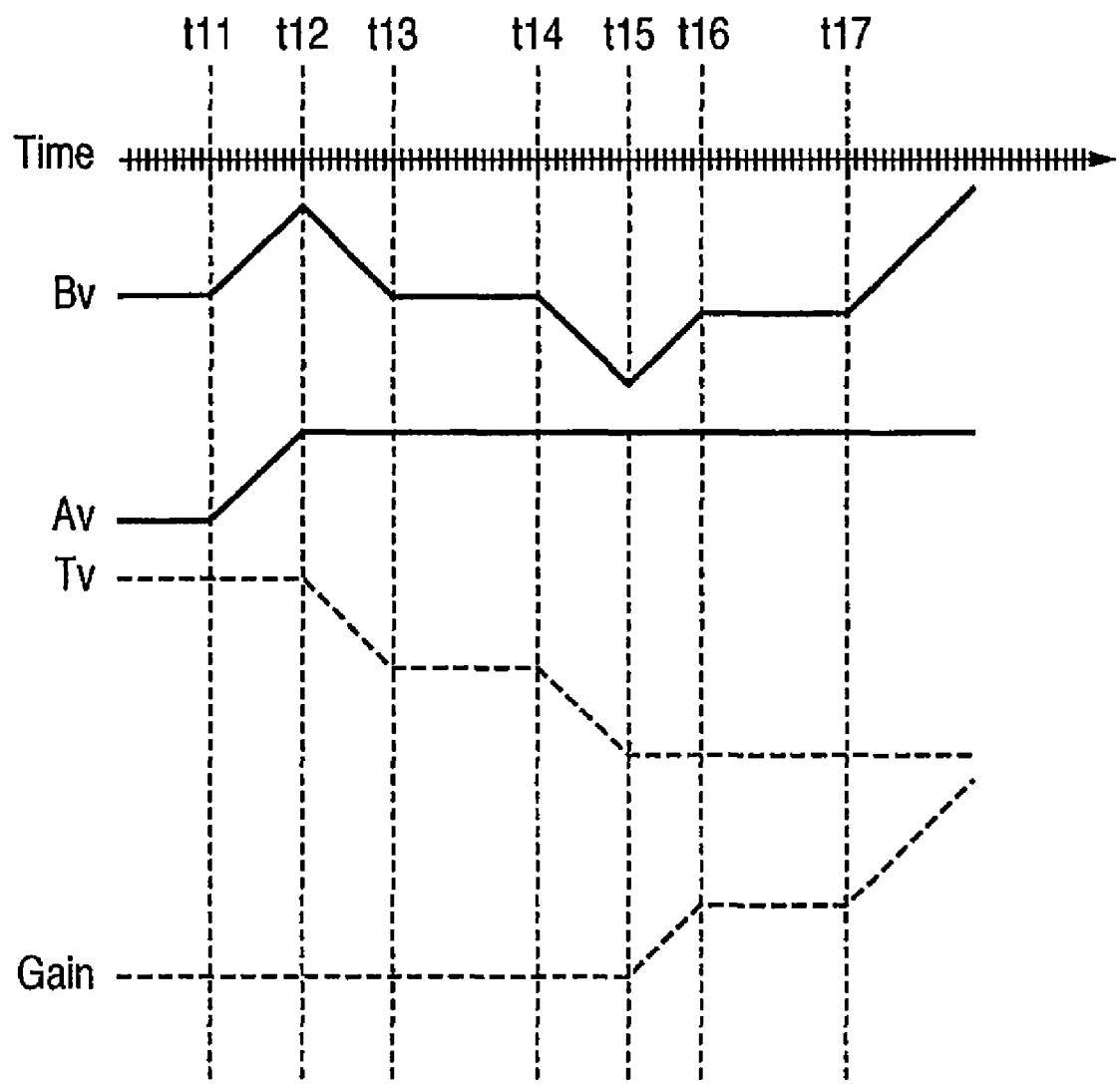
FIG. 11 is a diagram showing an example of image sensing condition data showing in time-series exposure changes in the second embodiment of the present invention.

FIG. 11 is a diagram showing relations with change over time between luminance By, aperture Av, shutter speed Tv, and gain Gain as parameters showing in time-series exposure changes, as an example of image sensing condition data. In the case of FIG. 11, a first exposure change start time is t11 and a first exposure change end time is t13. Similarly, a second exposure change start time is t14 and a second exposure change end time is t16. Accordingly, exposure stability zones are t13-t14 and t16-t17. This information is used during moving image print output.

In addition, change start time, change end time, amount of change, and vector relating to angle of view change and subject motion are also recorded as parameters showing in time-series changes. Technologies involving the use of angular velocity sensors for angle of view changes and electronic vibration-proof and the like for subject motion are used.

Moreover, information on a replacement lens like that of a single-lens-reflex camera is included in camera characteristic data produced by the moving image sensing condition data production unit 67 described above. The content of that lens information includes, in addition to image sensing condition data such as name/type/design values/zoom position/F value and so forth, characteristics data such as ambient light amount loss data/chromatic aberration information. In the case of a detachable replacement lens, when connected directly information that the lens itself holds can be transferred to the printer side through the camera.

Such image sensing condition data as the exposure changes, angle of view changes, subject motion and the like described above is continuously recorded in the thumbnail image, converted by the format converter 56 together with the moving image data at the end of image sensing, and recorded in the buffer 58 by the image recording unit 57.

It should be noted that although the example above is described as attaching the exposure change data to the thumbnail file that is attached separately to the moving image data, the present invention is not limited thereto, and the exposure data at each instant of the moving image may be recorded in the moving image data itself.

Figure 12:
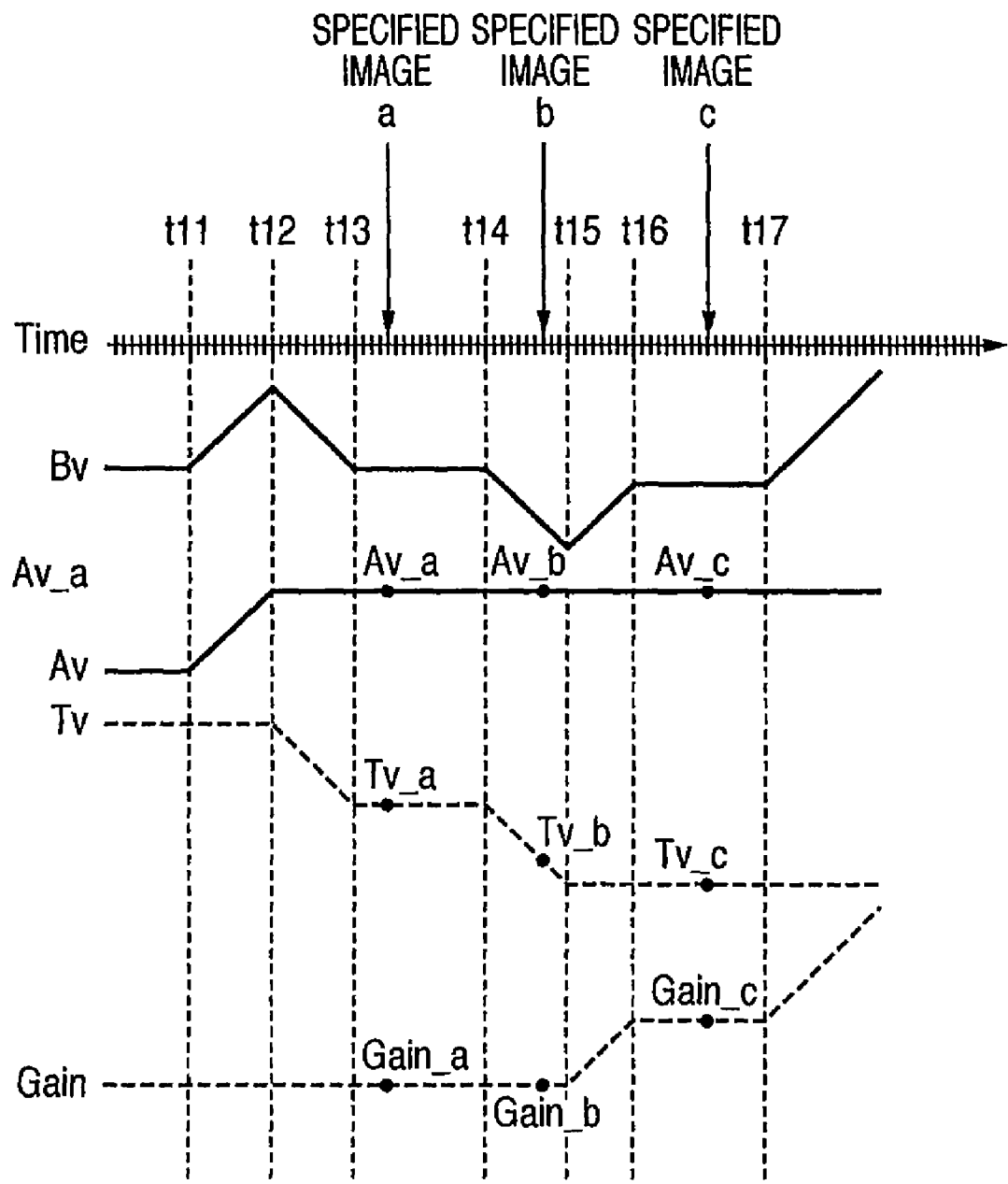
FIG. 12 is a diagram showing a relation between timing of print image specification and changes in exposure in the second embodiment of the present invention.
Figure 13:
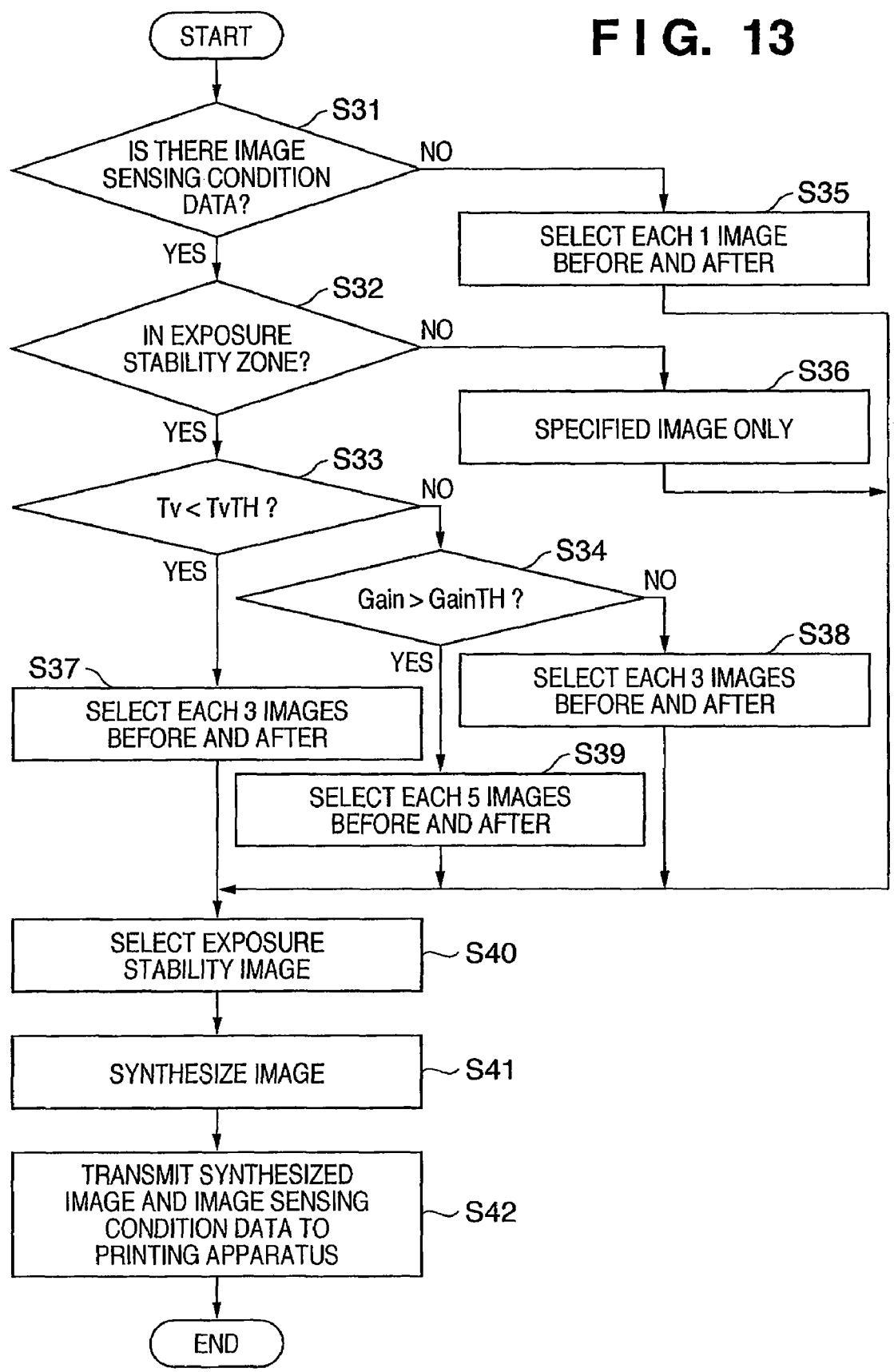
FIG. 13 is a flow chart illustrating a process of generating a still image for printing of a moving image in the second embodiment of the present invention.

A description is now given of processing when printing a moving image, with reference to FIG. 12 and FIG. 13.

FIG. 12 is a diagram showing timing when carrying out print instruction in an image in which exposure changes have occurred as shown in FIG. 11. FIG. 13 is a flow chart illustrating a moving image print process. The example shown in FIG. 12 shows a case in which moving image frames between t13-t14 (specified image a), between t14-t15 (specified image b), and between t16-t17 (specified image c) are specified for printing.

First, when the user plays back the moving image file on the display unit 65 and specifies from among the sensed images an image frame he/she wishes to print using the print image determination unit 69, the processing shown in FIG. 13 is started by the printer image processor 87.

In step S31, it is determined whether or not image sensing condition data is attached to the moving image frame specified for printing. As image sensing condition data, as described above, there are exposure changes such as aperture (Av), shutter speed (Tv), gain (Gain) and the like, as well as angle of view and subject motion. Here, however, image sensing condition data is described as exposure changes.

When there is no image sensing condition data, processing proceeds to step S35, the moving image frames preceding and following the moving image frame specified for printing (three frames total) are selected, and processing proceeds to step S40.

When there is image sensing condition data, it is determined whether or not the moving image frame specified for printing is an exposure stability zone frame (step S32). In the example shown in FIG. 12, the specified image a and the specified image c are moving image frames specified for printing in the exposure stability zone. When there is no moving image frame specified for printing in the exposure stability zone, processing proceeds to step S36, only the moving image frame specified for printing is selected, and processing proceeds to step S40.

In step S32, when the moving image frame specified for printing is one that is in the exposure stability zone, in step S33 it is determined whether or not the shutter speed (Tv) is lower than a predetermined value (TvTH). Generally, the slower the shutter speed the greater the camera shake, and thus if Tv<TvTH processing proceeds to step S37, the three frames each before and after the moving image frame specified for printing are selected (seven frames total), and processing proceeds to step S40.

If Tv≧TvTH, processing proceeds to step S34 and it is determined whether or not the gain (Gain) is greater than a threshold (GainTH). Since the greater the gain the greater the noise, it is preferable to increase the number of frames used in image synthesis described later and remove the noise. Therefore, if Gain>GainTH, processing proceeds to step S39 and the five frames each before and after the moving image frame specified for printing are selected (11 frames total). If Gain≦GainTH, in step S38 the three frames each before and after are selected (seven frames total) and processing proceeds to step S40.

It should be noted that the numbers of frames selected in steps S35-S39 described above are one example thereof, and the present invention is not limited to these numbers of frames. In addition, the parameter for determining the number of frames to select is not only the TV and the Gain, and alternatively, the aperture, the angle of view change amount, the subject motion amount, or any other information in the image sensing condition data may be used.

In step S40, of the moving image frames selected in the any of steps S35-S39, only the images that are in the exposure stability zone are selected and in step S41 are synthesized by averaging. Then, the synthesized image data is transmitted via the image transmitter 71, and the image sensing condition data is transmitted via the image sensing condition data transmitter unit 72, to the printing apparatus 8 (step S42). It should be noted that the printing apparatus 8 receives the transmitted image data and image sensing condition data through the image receiver 81 and the image sensing condition data receiver 85, respectively, and carries out printing.

In addition, in a case in which the specified images a-c (multiple images) are specified all at once, only the times of the specified frame images are once held and then processed all at once during the printing process. When the time is specified, a thumbnail image of the playback moving image file is called up by the image recording unit 57, the exposure change information and the specified time of the specified images a-c to be printed are correlated from the recorded image sensing condition data, and the number of images (frames) to use in synthesis is determined.

(Variation)

In the second embodiment described above, a description is given of a case in which, once the frames to be transmitted to the printing apparatus 8 are determined in steps S35-S40 shown in FIG. 13, the relevant moving image frames are synthesized on the image sensing apparatus 5 side, and the synthesized still image for printing is transmitted to the printing apparatus 8.

However, the process of synthesizing the determined moving image frames may be carried out at the printing apparatus 8, in which case the frames to be transmitted to the printing apparatus 8 determined in steps S35-S40 shown in FIG. 5 are transmitted as is to the printing apparatus 8 and the synthesizing process carried out there.

Although in the second embodiment described above the image correction processing is set by the user when the camera and the printer are connected directly to each other, an arrangement in which the connection is between a PC and the printer is also within the scope of the present invention.

Other Embodiments

The object of the present invention may also be achieved as follows. First, a storage medium (or a recording medium) on which is recorded software program code that implements the functions of the embodiments described above is supplied to a system or an apparatus. Then, a computer (or CPU, MPU or the like) of the system or apparatus reads and executes the program code stored on the storage medium. In this case, the program code read out from the storage medium itself implements the functions of the embodiments described above, and the storage medium storing the program code constitutes the present invention.

Besides cases where the aforementioned functions according to the embodiments are implemented by executing the read program by computer, an operating system (OS) or the like running on the computer may perform all or a part of the actual processing, so that the functions of the foregoing embodiment are implemented by this processing. Examples of storage media that can be used for supplying the program code are a flexible disk, a hard disk, a ROM, a RAM, magnetic tape, a non-volatile memory card, a CD-ROM, a CD-R, a DVD, an optical disk, a magneto-optical disk, and an MO. In addition, a computer network such as a LAN (Local Area Network) or a WAN (Wide Area Network) may be used to supply the program code.

The present invention is not limited to the above-described embodiments, and many modifications and variations of the present invention are possible without departing from the spirit and scope thereof. Therefore, in order to apprise the public of the scope of the present invention, the following claims are appended.

This application claims the benefit of Japanese Patent Application No. 2006-175786, filed on Jun. 26, 2006, which is hereby incorporated by reference herein in its entirety.

The invention claimed is:

1. An image sensing apparatus capable of sensing a moving image, said image sensing apparatus comprising:
an image sensing unit configured to sense an image and to acquire image data; and
a recording unit configured to record on a removable recording medium (a) a moving image formed with a plurality of frames of the image data acquired by said image sensing unit, and (b) correlation information regarding a correlation between the image data of a frame newly acquired by said image sensing unit and the image data of a frame sensed immediately before the newly acquired frame,
wherein said recording unit records on the removable recording medium, together with the moving image and on a frame-by-frame basis, the correlation information as attribute information of the image data of the frame at the time of sensing the moving image,
wherein the correlation information is used to determine which of plural frames should be synthesized together to form a still frame for printing, and
wherein frames lacking correlation are not synthesized.

2. The image sensing apparatus according to claim 1, wherein said recording unit records, on the removable recording medium, the correlation information indicating mutually related frames.

3. The image sensing apparatus according to claim 2, further comprising a synthesizing unit configured to synthesize image data of the mutually related frames based on the correlation information and to generate synthesized image data.

4. The image sensing apparatus according to claim 1, further comprising:
a selection unit configured to select a frame to print from the plurality of frames of the moving image recorded on the removable recording medium;

a determination unit configured to determine, among a plurality of frames sensed before and after the selected frame, a frame or frames related to the selected frame on the basis of correlation information of the selected frame and the plurality of frames sensed before and after the selected frame;

a synthesizing unit configured to synthesize image data of the selected frame and image data of the frame or frames determined by said determination unit and to generate a synthesized image; and an output unit configured to output to a printing apparatus image data for printing synthesized by said synthesizing unit.

5. The image sensing apparatus according to claim 1, wherein said recording unit records the correlation information when generating the moving image.

6. The image sensing apparatus according to claim 1, wherein said recording unit is configured to record the correlation information as attribute information of the newly acquired frame.

7. The image sensing apparatus according to claim 1, wherein the correlation information indicates either a change amount is small or a change amount is large, with respect to the image data of a frame sensed immediately before the newly acquired frame.

8. The image sensing apparatus according to claim 1, wherein the correlation information indicates a change in an image sensing parameter.

9. The image sensing apparatus according to claim 1, wherein the correlation information indicates at least one of a change in exposure, a change in an angle of view, and a change in movement of a subject.

10. The image sensing apparatus according to claim 1, wherein said recording unit records the correlation information for a frame of the moving image data.

11. A control method for an image sensing apparatus capable of sensing a moving image, said control method comprising:

an image sensing step of sensing an image and acquiring image data with an image sensing unit; and a recording step of recording on a removable recording medium (a) a moving image formed with a plurality of frames of the image data acquired in said image sensing step, and (b) correlation information indicating a correlation between the image data of a frame newly acquired in said image sensing step and the image data of a frame sensed immediately before the newly acquired frame, wherein, in the recording step, the correlation information is recorded on the removable recording medium, together with the moving image and on a frame-by-frame basis, as attribute information of the image data of the frame at the time of sensing a moving image, wherein the correlation information is used to determine which of plural frames should be synthesized together to form a still frame for printing, and wherein frames lacking correlation are not synthesized.

12. The control method according to claim 11, wherein said recording step records, on the removable recording medium, the correlation information indicating mutually related frames.

13. The control method according to claim 12, further comprising a synthesizing step of synthesizing image data of the mutually related frames based on the correlation information and of generating synthesized image data.

14. A non-transitory storage medium readable by a data processing apparatus, the storage medium storing a program that is executable by the data processing apparatus, wherein the program includes program code for causing the data processing apparatus to perform a control method according to claim 11.

* * * * *